(12) United States Patent
Zhao et al.

(10) Patent No.: US 12,311,777 B2
(45) Date of Patent: May 27, 2025

(54) ELECTRIFIED VEHICLE CONFIGURED TO ADJUST ENGINE PULL UP/DOWN THRESHOLDS BASED ON BATTERY STATE OF HEALTH

(71) Applicant: Ford Global Technologies, LLC, Dearborn, MI (US)

(72) Inventors: Yanan Zhao, Ann Arbor, MI (US); Xiaohong Nina Duan, Canton, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 793 days.

(21) Appl. No.: 17/586,029

(22) Filed: Jan. 27, 2022

(65) Prior Publication Data
US 2023/0234451 A1    Jul. 27, 2023

(51) Int. Cl.
  *B60L 15/20*    (2006.01)
  *B60L 58/16*    (2019.01)

(52) U.S. Cl.
  CPC .......... *B60L 15/2045* (2013.01); *B60L 58/16* (2019.02); *B60L 2240/80* (2013.01)

(58) Field of Classification Search
  CPC .. B60L 15/2045; B60L 58/16; B60L 2240/80; B60L 50/15; B60L 50/60; B60L 58/12
  See application file for complete search history.

(56) References Cited

U.S. PATENT DOCUMENTS

| | | | |
|---|---|---|---|
| 7,489,101 B2 | 2/2009 | Bockelmann et al. | |
| 8,781,664 B2* | 7/2014 | Sujan | B60W 20/40 180/65.265 |
| 10,005,372 B2 | 6/2018 | Lee | |
| 11,501,583 B2* | 11/2022 | Chen | H01M 10/48 |
| 2004/0070353 A1* | 4/2004 | Kayukawa | B60L 58/24 318/139 |
| 2013/0158755 A1 | 6/2013 | Tang et al. | |
| 2016/0052410 A1* | 2/2016 | Zhou | B60L 58/20 320/109 |
| 2016/0052423 A1* | 2/2016 | Zhou | B60L 15/06 701/22 |
| 2016/0052505 A1* | 2/2016 | Zhou | B60L 15/2045 903/930 |
| 2018/0111599 A1* | 4/2018 | Wang | B60W 20/13 |
| 2018/0118049 A1* | 5/2018 | Ko | B60L 58/12 |

(Continued)

*Primary Examiner* — Nha T Nguyen
(74) *Attorney, Agent, or Firm* — David B. Kelley; Brooks Kushman P.C.

(57) ABSTRACT

An electrified vehicle includes a traction battery, an engine, and a controller. The controller is configured to generate a request for the engine in response to an input passing a threshold and to adjust the threshold when a state of health (SOH) of the traction battery is at a chance of violating a target, such as a warranty target. The request for the engine may be an engine pull up (EPU) request for starting the engine with the threshold being an EPU threshold in which case the controller lowers the EPU threshold when the battery SOH is at a chance of violating the target. The request for the engine may be an engine pull down (EPD) request for stopping the engine with the threshold being an EPD threshold in which case the controller lowers the EPD threshold when the battery SOH is at a chance of violating the target.

16 Claims, 4 Drawing Sheets

(56) References Cited

U.S. PATENT DOCUMENTS

| | | | |
|---|---|---|---|
| 2019/0032586 A1* | 1/2019 | Fracchia | B60K 6/387 |
| 2019/0184964 A1* | 6/2019 | Murakami | B60K 6/28 |
| 2019/0202432 A1* | 7/2019 | Kim | B60W 20/13 |
| 2020/0353839 A1* | 11/2020 | Tarchinski | B60L 53/62 |
| 2021/0057927 A1* | 2/2021 | Kazuno | H02J 9/002 |
| 2021/0268932 A1* | 9/2021 | Zhang | B60L 58/13 |
| 2021/0323532 A1* | 10/2021 | Huh | B60K 6/387 |
| 2022/0334596 A1* | 10/2022 | Chan | G05D 1/0875 |

* cited by examiner

ELECTRIFIED VEHICLE CONFIGURED TO ADJUST ENGINE PULL UP/DOWN THRESHOLDS BASED ON BATTERY STATE OF HEALTH

TECHNICAL FIELD

The present disclosure relates to an electrified vehicle configured to adjust pull up/down thresholds for an engine of the vehicle based on a state of health of a traction battery of the vehicle.

BACKGROUND

An electrified vehicle includes a traction battery ("battery") for providing power to a motor of the vehicle to propel the vehicle. An electrified vehicle such as a hybrid electric vehicle further includes an engine for propelling the vehicle.

SUMMARY

A vehicle includes a traction battery, an engine, and a controller. The controller is configured to adjust a threshold for an engine request when a state of health (SOH) of the traction battery is at a chance of violating a target.

In an embodiment, the threshold is an engine pull up (EPU) threshold. The controller is further configured to lower the EPU threshold when the SOH of the traction battery is at a chance of violating the target.

In an embodiment, the threshold is an engine pull down (EPD) threshold. The controller is further configured to lower the EPD threshold when the SOH of the traction battery is at a chance of violating the target.

In an embodiment, the controller is configured to detect that the SOH of the traction battery is at a chance of violating the target when the SOH of the traction battery is less than an expected SOH. The controller may adjust the threshold based on at least one of (i) a difference between the SOH of the traction battery and the expected SOH, (ii) a difference between a rate of change of the SOH of the traction battery and a rate of change of the expected SOH, and (iii) a proximity of the SOH of the traction battery to the target.

In an embodiment, the controller is configured to detect that the SOH of the traction battery is at a chance of violating the target when the SOH of the traction battery is less than an alert level SOH that is less than an expected SOH. The controller may adjust the threshold based on at least one of (i) a difference between the SOH of the traction battery and the expected SOH, (ii) a difference between a rate of change of the SOH of the traction battery and a rate of change of the expected SOH, and (iii) a proximity of the SOH of the traction battery to the target.

In an embodiment, the target is a warranty target. In an embodiment, the target is based on either vehicle usage time or vehicle driven distance.

Another vehicle includes a traction battery, an engine, and a controller. The controller is configured to generate a request for the engine in response to an input passing a threshold and to adjust the threshold when a SOH of the traction battery is at a chance of violating a target. The request for the engine may be an EPU request for starting the engine with the threshold being an EPU threshold. In this case, the controller is further configured to generate the EPU request in response to the input becoming greater than the EPU threshold and to lower the EPU threshold when the SOH of the traction battery is at a chance of violating the target. The request for the engine may be an EPD request for stopping the engine with the threshold being an EPD threshold. In this case, the controller is further configured to generate the EPD request in response to the input becoming less than the EPD threshold and to lower the EPD threshold when the SOH of the traction battery is at a chance of violating the target.

A system for a vehicle having a traction battery and an engine includes a detector and a controller. The detector is for detecting a SOH of the traction battery. The controller is configured to generate an EPU request for starting the engine in response to an input becoming greater than an EPU threshold and to generate an EPD request for stopping the engine in response to the input becoming less than an EPD threshold. The controller is further configured to lower at least one of the EPU threshold and the EPD threshold when the SOH of the traction battery is at a chance of violating a target.

A method for use with a vehicle having a traction battery and an engine includes generating a request for the engine in response to an input passing a threshold. The method further includes adjusting the threshold when a SOH of the traction battery is at a chance of violating a target.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Power capability and energy capacity of the battery decay as the battery is used over time. Ensuring the battery life according to a desired engineering standard reduces warranty. Thermal management is an option for extending the battery life by cooling the battery temperature to an optimal operating range. Generally, when the battery is operated at temperatures close to or above nominal operating temperature, the battery decays faster with increasing temperatures. An issue is that energy from the battery is used to implement battery cooling. Accordingly, there is a tradeoff between battery life and battery cooling energy consumption. The battery decay is also related with current passing through the battery, and generally the higher the current or energy throughput increase battery decay.

Embodiments of the present invention relate to an electrified vehicle having a traction battery ("battery") and an internal combustion engine ("engine") for vehicle propulsion. A controller of the vehicle generates an engine pull up (EPU) request in response to an input of the vehicle becoming greater than an EPU threshold. In response to the EPU request, the engine is started to provide power for propelling the vehicle. The controller generates an engine pull down (EPD) request in response to the input of the vehicle becoming less than an EPD threshold. In response to the EPD request, the engine is shut off and thereby only the battery provides power for propelling the vehicle. Further, when the state of health of the battery is at a chance of violating a target for the battery, the controller lowers the EPU threshold and/or the EPD threshold such that the engine will be pulled up earlier and/or pulled down later to thereby reduce the time duration of EV (electric vehicle) only mode (i.e., reduce the time during which only the battery provides power for vehicle propulsion). Then with an extended HEV (hybrid electric vehicle) mode (i.e., the mode in which the engine is primarily used for vehicle propulsion), the battery can either totally cease its operation or provide relatively less power. As such, the controller can selectively prioritize battery state of health. Specifically, the state of health of the battery is preserved when a chance of violating the target for the battery is identified.

Figure 1:
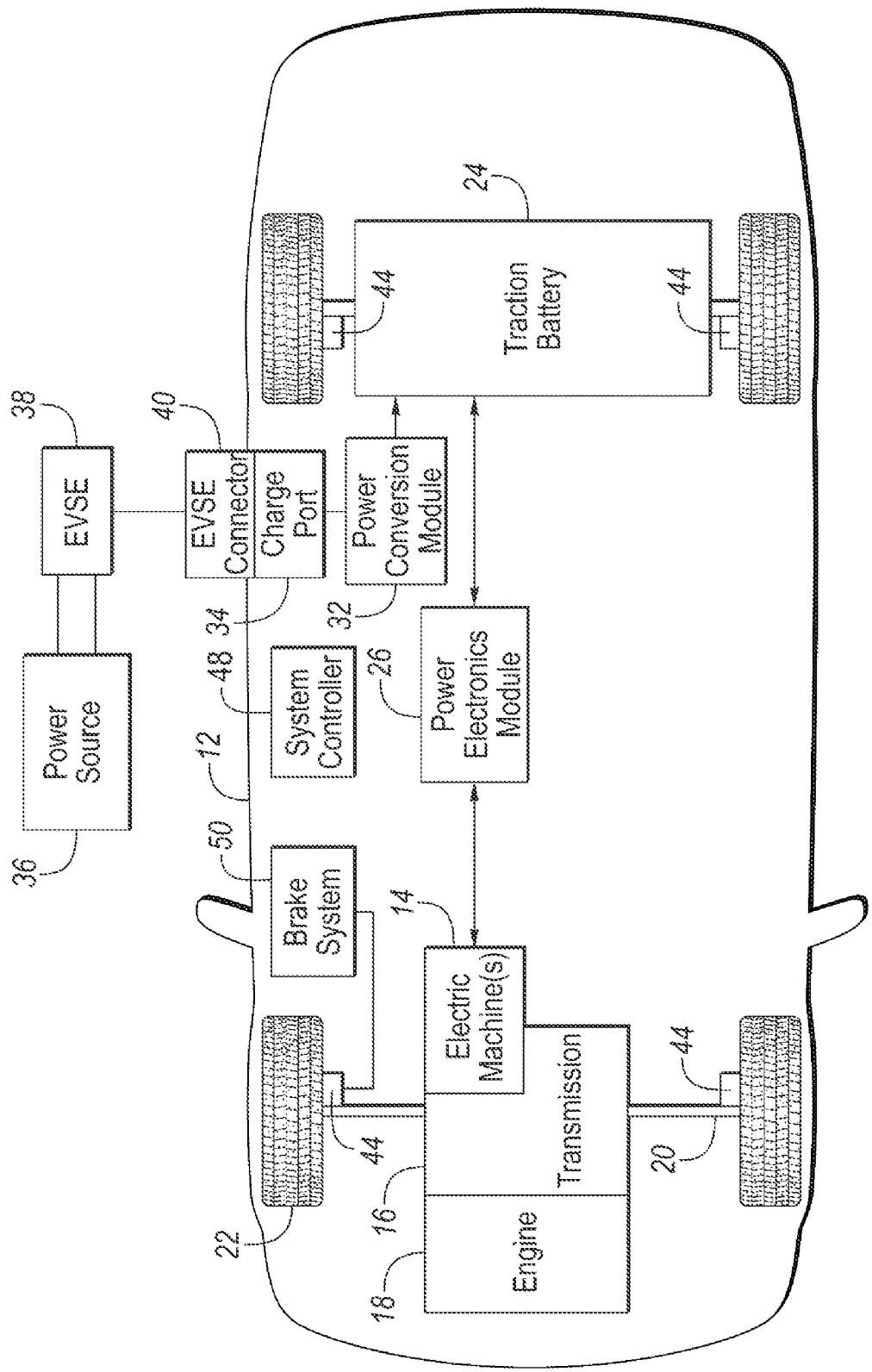
FIG. 1 illustrates a block diagram of an electrified vehicle having a traction battery and an internal combustion engine.

Referring now to FIG. 1, a block diagram of an exemplary electrified vehicle 12 is shown. In this example, vehicle 12 is a plug-in hybrid electric vehicle (PHEV) having an engine 18 and a traction battery 24.

Vehicle 12 includes one or more electric machines 14 mechanically connected to a transmission 16. Electric machine 14 is capable of operating as a motor and as a generator. Transmission 16 is mechanically connected to engine 18 and to a drive shaft 20 mechanically connected to wheels 22. Electric machine 14 can provide propulsion capability while engine 18 is turned on or off. Electric machine 14 acting as a generator can recover energy that may normally be lost as heat in a friction braking system. Electric machine 14 may reduce vehicle emissions by allowing engine 18 to operate at more efficient speeds and allowing vehicle 12 to be operated in electric mode with engine 18 off under certain conditions.

Battery 24 stores energy that can be used by electric machine 14 for propelling vehicle 12. Battery 24 typically provides a high-voltage (HV) direct current (DC) output. Battery 24 is electrically connected to a power electronics module 26. Power electronics module 26 is electrically connected to electric machine 14 and provides the ability to bi-directionally transfer energy between battery 24 and the electric machine. For example, battery 24 may provide a DC voltage while electric machine 14 may require a three-phase alternating current (AC) current to function. Power electronics module 26 may convert the DC voltage to a three-phase AC current to operate electric machine 14. In a regenerative mode, power electronics module 26 may convert three-phase AC current from electric machine 14 acting as a generator to DC voltage compatible with battery 24.

Battery 24 is rechargeable by an external power source 36 (e.g., the grid). Electric vehicle supply equipment (EVSE) 38 is connected to external power source 36. EVSE 38 provides circuitry and controls to manage the transfer of energy between external power source 36 and vehicle 12. External power source 36 may provide DC or AC electric power to EVSE 38. EVSE 38 may have a charge connector 40 for plugging into a charge port 34 of vehicle 12. Charge port 34 may be any type of port configured to transfer power from EVSE 38 to vehicle 12. A power conversion module 32 of vehicle 12 may condition power supplied from EVSE 38 to provide the proper voltage and current levels to battery 24. Power conversion module 32 may interface with EVSE 38 to coordinate the delivery of power to battery 24. Alternatively, various components described as being electrically connected may transfer power using a wireless inductive coupling.

Wheel brakes 44 are provided for slowing and preventing motion of electrified vehicle 12. Wheel brakes 44 are part of a brake system 50.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 is present to coordinate the operation of the various components. Controller 48 includes electronics, software, or both, to perform the necessary control functions for operating electrified vehicle 12. In embodiments, controller 48 is a combination vehicle system controller and powertrain control module (VSC/PCM). Although controller 48 is shown as a single device, controller 48 may include multiple controllers in the form of multiple hardware devices, or multiple software controllers with one or more hardware devices.

As indicated, battery 24 has a state of health (SOH). In general, the SOH of battery 24 is a figure of merit of the condition of the battery relative to an ideal condition of the battery, such as the condition of the battery at the time of its manufacture. Battery SOH, defined with battery capacity decrease or resistance growth, can be monitored, and managed during operation of vehicle 12. Battery SOH is defined as 100% for a new battery at the beginning of life (BOL) and is defined as 0% at the end of life (EOL).

Controller 48 can determine a present SOH of battery 24 by considering information from one or more sources. The SOH of battery 24 can be determined on vehicle 12 such as, for example, using battery capacity learned on board or through the cloud. The SOH of battery 24 may be determined by evaluating or considering one or more of the following parameters: resistance, conductance, capacity, voltage, self-discharge, ability to accept a charge, number of charge-discharge cycles, age of the battery, temperature of the battery during its previous uses, total energy charged and discharged, etc.

Figure 2A:
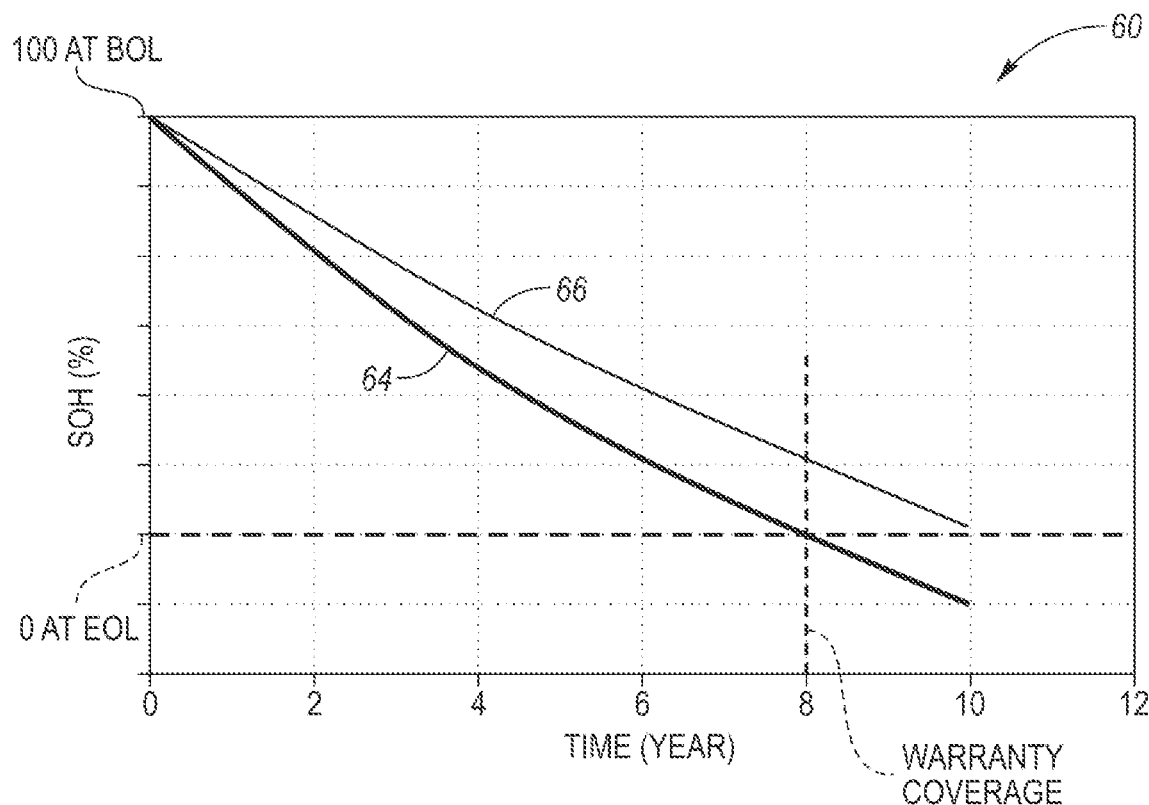
FIG. 2A illustrates a graphical representation of a "warranty" decay trajectory and an "expected" decay trajectory of the state of health of the traction battery relative to vehicle usage time.
Figure 2B:
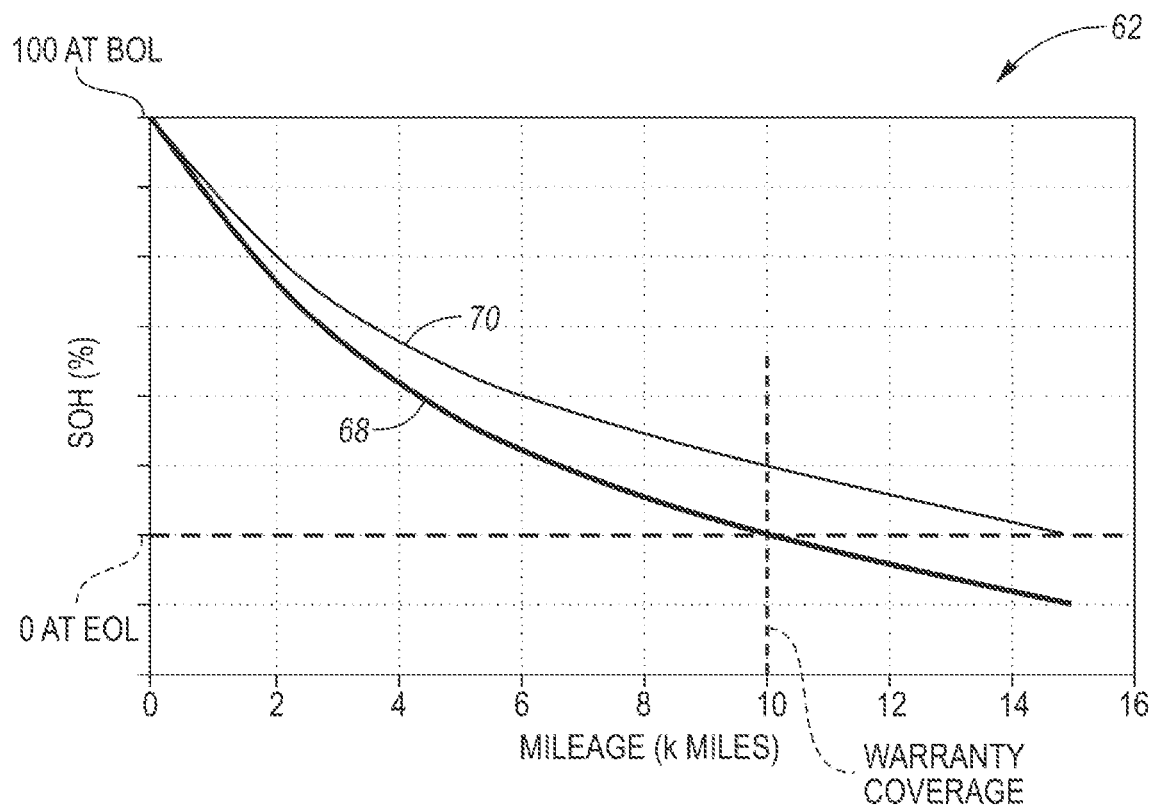
FIG. 2B illustrates a graphical representation of a warranty decay trajectory and an expected decay trajectory of the state of health of the traction battery relative to vehicle driven distance.

Referring now to FIGS. 2A and 2B, graphical representations 60 and 62 depicting decay trajectories of the SOH of battery 24 relative to vehicle usage time (FIG. 2A) and vehicle driven distance (i.e., mileage of vehicle 12) (FIG. 2B) are shown.

In FIG. 2A, graphical representation 60 includes a "warranty" decay trajectory 64 and an "expected" decay trajectory 66 of the SOH of battery 24 relative to vehicle usage time. As such, graphical representation 60 shows a pair of battery SOH vs. vehicle usage time curves which can be used to monitor battery SOH against a warranty target and against an engineering standard target. Specifically, to meet a target battery life warranty coverage, such as for example eight years, warranty SOH decay trajectory ("battery life, time warranty curve" or "battery life warranty curve") 64 is derived across 0-8 years. Similarly, to meet a target battery life engineering standard, such as for example ten years, expected SOH decay trajectory ("battery life, time expected curve" or "battery life expected curve") 66 is derived across 0-10 years.

Likewise, in FIG. 2B, graphical representation 62 includes a warranty decay trajectory 68 and an expected decay trajectory 70 of the SOH of battery 24 relative to vehicle driven distance. As such, graphical representation 62 shows a pair of battery SOH vs. vehicle driven distance curves which can be used to monitor battery SOH against a warranty target and against an engineering standard target. Specifically, to meet a target vehicle driven distance warranty coverage, such as for example 100K miles, warranty SOH decay trajectory ("battery life, driven distance warranty curve" or "battery life warranty curve") 68 is derived across 0-100K miles. Similarly, to meet a target driven distance engineering standard, such as for example 150K miles, expected SOH decay trajectory ("battery life, driven distance expected curve" or "battery life expected curve") 70 is derived across 0-150K miles.

According to the examples of FIGS. 2A and 2B, the warranty coverage for battery life with required capability and capacity is eight years or 100K miles, whichever occurs first; and the engineering standard of battery design is to achieve ten years or 150K miles. Ensuring the battery life to its design reduces warranty. The decay of battery capability and capacity depends on many factors, such as the time the battery is used, the temperature the battery experiences during charge/discharge, battery charging schedules and methods, and the like.

As indicated, controller 48 can detect the SOH of battery 24. Controller 48 is further operable to compare the SOH of battery 24 with the "warranty" and the "expected" battery life per vehicle usage time and vehicle mileage. More particularly, with reference to FIG. 2A, controller 48 is operable to compare the SOH of battery 24 with battery life warranty curve 64 and with battery life expected curve 66 per vehicle usage time. Likewise, with reference to FIG. 2B, controller 48 is operable to compare the SOH of battery 24 with battery life warranty curve 68 and with battery life expected curve 70 per vehicle mileage. Controller 48 is further operable to control the operation of electrified vehicle 12 differently (e.g., control the operation of engine 18 and battery 24 differently) depending on the SOH difference between the SOH of battery 24 and any of the battery life "warranty" curves 64 and 68 and the battery life "expected" curves 66 and 70.

In accordance with embodiments of the present invention, an "alert" decay trajectory of the SOH of battery 24 is further considered in conjunction with the warranty and expected SOH decay trajectories for each of vehicle time and vehicle distance. Each alert level SOH decay trajectory is added to define two SOH zones: a first zone in which SOH is below the alert level SOH decay trajectory; and a second zone in which SOH is above the alert level SOH decay trajectory. As will be explained, these zones are defined for controller 48 to monitor present SOH of battery 24, project future health (i.e., future SOH) of battery 24, and predict a chance of battery 24 not meeting life expectancy.

Figure 3A:
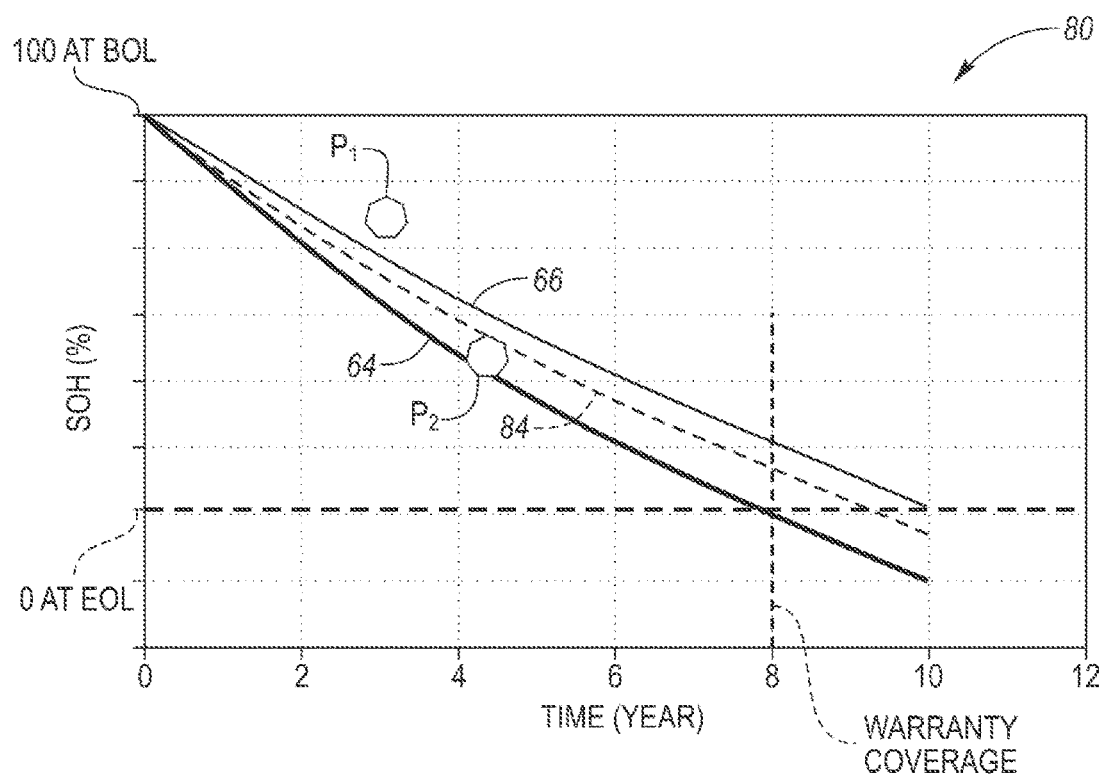
FIG. 3A illustrates a graphical representation of an "alert" decay trajectory, the warranty decay trajectory, and the expected decay trajectory of the state of health of the traction battery relative to vehicle usage time.
Figure 3B:
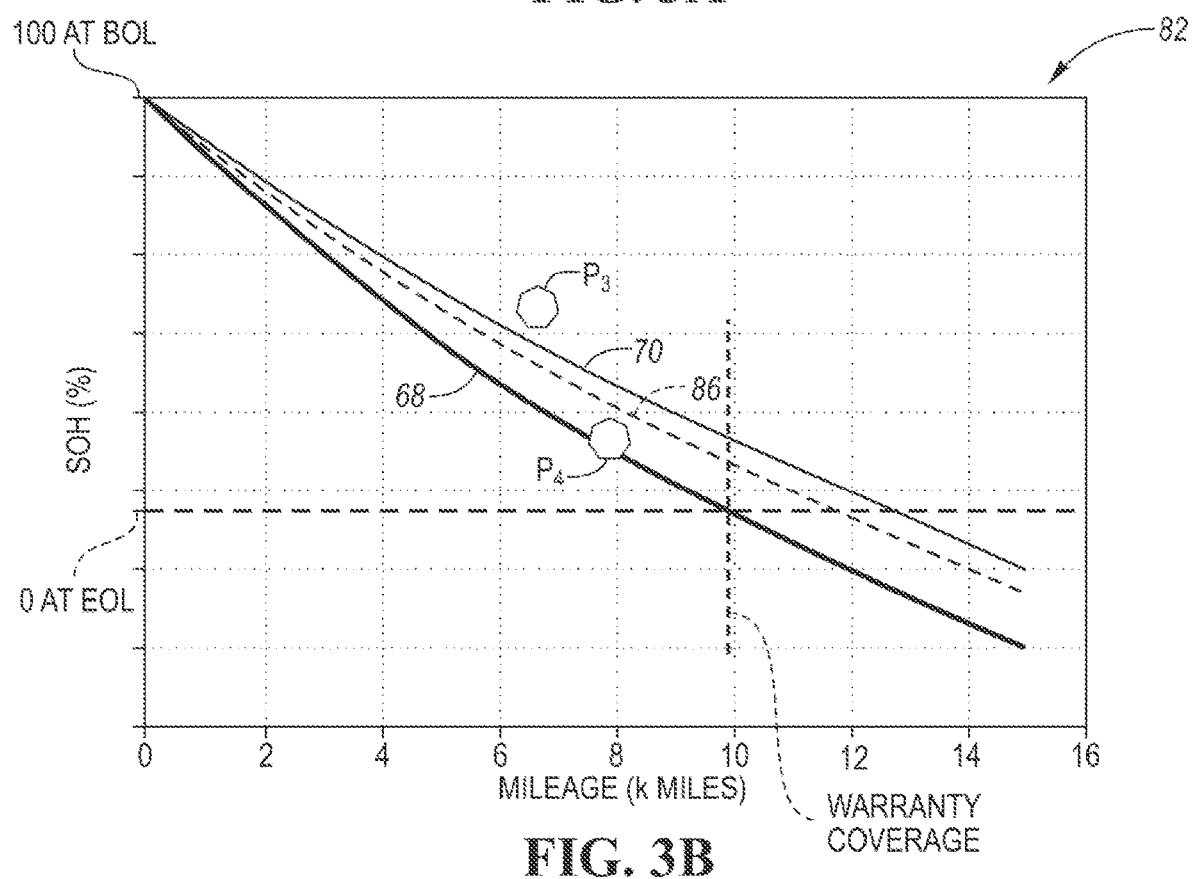
FIG. 3B illustrates a graphical representation of an alert decay trajectory, the warranty decay trajectory, and the expected decay trajectory of the state of health of the traction battery relative to vehicle driven distance.

Referring now to FIGS. 3A and 3B, with continual reference to FIGS. 2A and 2B, graphical representations 80 and 82 depicting an alert level SOH decay trajectory added to the warranty SOH decay trajectory and the expected SOH decay trajectory relative to vehicle usage time (FIG. 3A) and vehicle driven distance (FIG. 3B) are shown.

In FIG. 3A, graphical representation 80 includes an alert level SOH decay trajectory ("battery life, time alert curve" or "battery life alert curve") 84 between warranty SOH decay trajectory (i.e., battery life warranty curve) 64 and expected SOH decay trajectory (i.e., battery life expected curve) 66. Battery life alert curve 84 is designed to be above battery life warranty curve 64 (i.e., be healthier than the battery life warranty curve) in order to provide sufficient time for controller 48 to correct vehicle operation and avoid the battery life warranty from being violated. Battery life alert curve 84 can either be the same as, above, or below battery life expected curve 66. For illustration purposes, in addition to being above battery life warranty curve 64, battery life alert curve 84 is below battery life expected curve 66.

In FIG. 3B, graphical representation 82 includes an alert level SOH decay trajectory ("battery life, driven distance alert curve" or "battery life alert curve") 86 between warranty SOH decay trajectory (i.e., battery life warranty curve) 68 and expected SOH decay trajectory (i.e., battery life expected curve) 70. For illustration purposes, in addition to being above battery life warranty curve 68, battery life alert curve 86 is below battery life expected curve 70.

In operation, the SOH of battery 24 relative to vehicle usage time may be located in one of the two SOH zones of graphical representation 80 of FIG. 3A. That is, the SOH of battery 24 is either above or below battery life alert curve 84. Likewise, the SOH of battery 24 relative to vehicle driven distance may be located in one of the two zones of graphical representation 82 of FIG. 3B. That is, the SOH of battery 24 is either above or below battery life alert curve 86.

In this regard, in FIG. 3A, a first SOH zone is defined as the area above battery life alert curve 84 based on vehicle usage time and a second SOH zone is defined as the area below battery life alert curve 84 based on vehicle usage time; and in FIG. 3B, a third SOH zone is defined as the area above battery life alert curve 86 based on vehicle mileage and a fourth SOH zone is defined as the area below battery life alert curve 86 based on vehicle mileage. As examples, as shown in FIGS. 3A and 3B, the SOH of battery 24 at point $P_1$ is in the first SOH zone, at point $P_2$ is in the second SOH zone, at point $P_3$ is in the third SOH zone, and at point $P_4$ is in the fourth SOH zone.

As summarized, there are four different SOH status zones. Two of the SOH zones are based on vehicle usage time (e.g., aging of battery 24) and the other two SOH zones are based on vehicle driven distance. When the SOH of battery 24 is in both of the two SOH zones above the alert level SOH decay trajectory (for example, when the SOH of battery 24 is at point $P_1$ in the first SOH zone and at point $P_3$ in the third SOH zone), the battery life is better than expected. Conversely, when the SOH of battery 24 is in at least one of the two SOH zones below the alert level SOH decay trajectory (for example, when the SOH of battery 24 is at point $P_2$ in the second SOH zone and/or at point $P_4$ in the fourth SOH zone), the battery life is at a chance of not meeting the warranty requirement. That is, the SOH of battery is at a chance of violating the warranty requirement when the SOH of battery 24 is below battery life alert curve 84 (FIG. 3A) and/or battery life alert curve 86 (FIG. 3B).

In accordance with embodiments of the present invention, when the SOH of battery 24 is at a chance of violating a target, controller 48 functions to prioritize the SOH of battery 24 (i.e., controller 48 functions to protect the battery life). In this regard, ordinarily, in operation of vehicle 12, controller 48 controller generates an engine pull up ("EPU") request in response to an input of vehicle 12 becoming greater than an EPU threshold and generates an engine pull down ("EPD") request in response to the input of vehicle 12 becoming less than an EPD threshold. In response to the EPU request, engine 18 is started to provide power for propelling vehicle 12. In response to the EPD request, engine 18 is shut off and thereby only battery 24 provides power for propelling vehicle 12.

Controller 48 functions to prioritize the SOH of battery 24 when the SOH of battery 24 is at a chance of violating a target by lowering the EPU threshold and/or the EPD threshold such that the controller pulls up engine 18 earlier and/or pulls down engine 18 later to thereby reduce the time duration during which only battery 24 provides power for vehicle propulsion. Consequently, while engine 18 is started, controller 48 can either totally cease operation of battery 24 or have battery 24 provide relatively less power.

In the exemplary embodiments of the present invention, the target is a warranty target (i.e., a warranty).

Herein, the phrase "Engine more control" in accordance with embodiments of the present invention refers to the control that pulls up engine 18 earlier and pulls down engine 18 later compared to the base (or existing) HEV EPUD (engine pull up/down) operation. "Engine more control" can be enabled or activated once battery SOH is located beneath any of battery life alert curves 84 and 86. As indicated, "Engine more control" can be achieved via adjusting calibration thresholds for engine EPUD control.

Controller 48 makes EPUD decisions based on many factors, including driver power demand, driver accelerator pedal input, vehicle speed, and the like. For example, controller 48 requests EPU when at least one of the following conditions is true:
(a) Pwr_drvDemand>Pwr_EPUthres, where Pwr_EPUthres can be an output of a calibration table based on vehicle speed and battery state of charge (SOC); or
(b) AccPedal>AccPedal_EPUthres, where AccPedal_EPUthres can be a scalar calibration; or
(c) vehSpeed>vehSpeed_EPUthres, where vehSpeed_EPUthres can be a scalar calibration.

Then, controller 48 requests EPD when there are no longer any factors that require running of engine 18. For example, controller 48 requests EPD when all of the following conditions are true:
(a) Pwr_drvDemand<Pwr_EPDthres, where Pwr_EPDthres can be an output of a calibration table based on vehicle speed and battery SOC;
(b) AccPedal<AccPedal_EPDthres, where AccPedal_EPDthres can be a scalar calibration; and
(c) vehSpeed<vehSpeed_EPDthres, where vehSpeed_EPDthres can be a scalar calibration.

As set forth, "EPUthres" is indicative of an EPU threshold and "EPDthres" is indicative of an EPD threshold. In "Engine more control", controller 48 lowers the respective EPU and EPD threshold values such that engine 18 can be pulled up earlier and pulled down later to reduce the time duration of EV only mode. Then, with the extended REV time duration, battery 24 can either totally cease its operation or operate with less power and current level.

In this regard, using driver demand power based EPU as an example:

Pwr_EPUthresMod=Pwr_EPUthresBase−Pwr_EPUthresOffset.

where Pwr_EPUthresMod is the modified threshold, Pwr_EPUthresBase is the threshold from base control, and Pwr_EPUthresOffset is the calibratable threshold offset value. Pwr_EPUthresOffset is set to positive (Pwr_EPUthresOffset>0) to PU engine 18 earlier at lower drive demand power.

And using driver demand power based EPD as an example:

Pwr_EPDthresMod=Pwr_EPDthresBase−Pwr_EPDthresOffset, where Pwr_EPDthresMod is the modified threshold, Pwr_EPDthresBase is the threshold from base control, and Pwr_EPDthresOffset is the calibratable threshold offset value. Pwr_EPDthresOffset is set to positive (Pwr_EPDthresOffset>0) to PD engine 18 later at lower drive demand power.

Accordingly, modified EPU threshold used during "Engine more control" operation is the original base control EPU threshold lowered by an EPU offset and modified EPD threshold used during "Engine more control" operation is the original base control EPD threshold lowered by an EPD offset.

Figure 4:
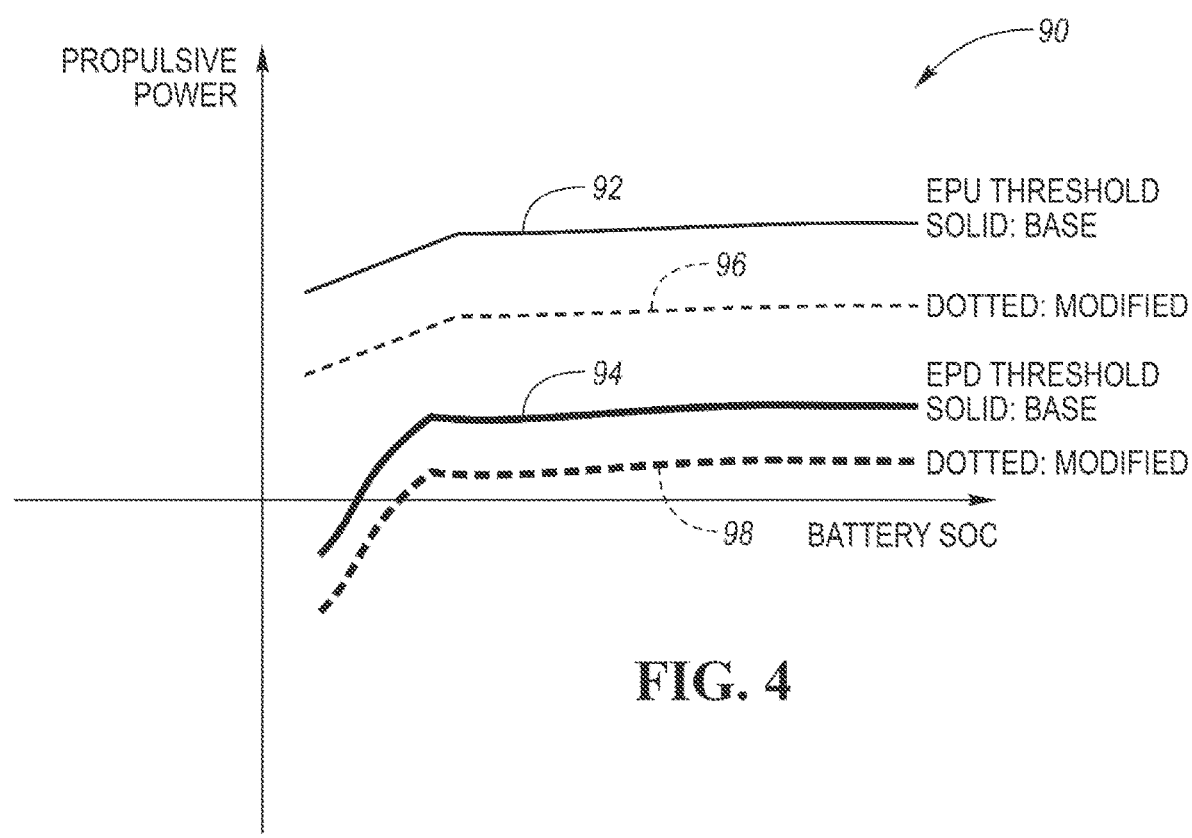
FIG. 4 illustrates a graphical representation depictive of a control scheme used by a controller of the vehicle to adjust an engine pull up threshold and an engine pull down threshold based on the state of health of the traction battery.

Referring now to FIG. 4, a graphical representation 90 of the "Engine more control" of controller 48 to adjust (i.e., lower) the original base control EPU and EPD thresholds based on the SOH of battery 24 being at a chance of violating the warranty requirement is shown. Graphical representation 90 compares the EPU power threshold between the original base control EPU power threshold 92 and the modified EPU power threshold 96 along with battery state-of-charge (SOC) changes assuming at the same vehicle speed level. Likewise, graphical representation 90 compares the EPD power threshold between the original base control EPD power threshold 94 and the modified EPD power threshold 98 along with battery SOC changes assuming at the same vehicle speed level. As shown, both EPU and EPD threshold levels are lowered down to thereby have engine 18 pull up earlier and pull down later with the same propulsive power request from the driver. The resulting extended HEV mode reduces usage of battery 24, and therefore benefits the battery life.

The EPUD thresholds for the other factors (AccPedal, vehSpeed, and the like) can have an offset in a similar way as described above.

The modified EPU threshold and the modified EPD threshold (e.g., Pwr_EPUthresMod and Pwr_EPDthresMod) are used for engine EPUD control once "Engine more control" is activated. The EPU threshold offset and the EPD threshold offset (e.g., Pwr_EPUthresOffset and Pwr_EPDthresOffset) are calibrated based on any of the following factors.

One factor is an urgency level (UL) of the battery life protection, which is calculated via the difference between the present SOH_prst (e.g., present capacity) and the expected SOH_exp (e.g., expected capacity derived from the "expected curve") for both time and mileage as described as follows:

UL_time=(SOH_exp_tm−SOH_prst_tm)/SOH_exp_tm @ present driven year/time

UL_mileage=(SOH_exp_ds−SOH_prst_ds)/SOH_exp_ds @ present driven miles

When UL>0, meaning SOH_prst is lower (worse) than SOH_exp, the higher the UL, the worse the SOH_prst, and more engine operation prioritization may be needed. When UL<0, meaning SOH_prst is higher (better) than SOH_exp, there is no need to activate "Engine more control" mode.

Then, arbitrating for the more severe one is conducted, with UL=max(UL_time, UL_mileage).

A calibratable lookup table can be used to obtain the Pwr_EPUthresOffset and Pwr_EPDthresOffset as a function of UL. The higher the UL, the larger the offset to thereby have longer HEV mode operations.

Another factor is whether the SOH_prst is below the "warranty curve", SOH_warr. When SOH is below the "warranty curve", higher Pwr_EPUthresOffset and Pwr_EPDthresOffset are used.

Another factor is whether the present driven year or miles are closer to (but less than) eight years, 100K miles. In this case, if the SOH_prst is closer or below the "warranty curve", the closer the vehicle's driven year or mileage is to eight years, 100K miles, the larger the offset to thereby have longer HEV mode operations.

Another factor is the observed SOH change rate vs. desired change rate in most recent time window or mileage window. The faster the (d(SOH)/dt)_act (observed SOH change rate, as the derivative of actual SOH over time) is compared with (d(SOH)/dt)_exp (desired change rate, as the derivative of expected SOH over time), the larger the offset to thereby have longer HEV mode operations.

As described, meeting battery life warranty is desired. Even though user usage and vehicle location will be different, it is desirable to have a similar battery useful life while satisfying the warranty requirement. Controller 48 is configured to help in the objective of meeting the battery life warranty. Controller 48 achieves this objective via monitoring battery SOH status based on "Warranty", "Expected", and "Alert" curves per both vehicle time and mileage history. In turn, controller 48 dynamically activates "Engine more control" to prioritize battery life protection when a chance of violating the warranty target is identified. For "Engine more control", the modified EPUD threshold can be adjusted via battery life protection urgency level (via battery present SOH and expected SOH) based on both its time and mileage history, whether the present SOH is under the warranty SOH, whether the present driven year or miles are closer to the warranted eight years or 100K miles, and/or, the rate of change of SOH.

As described, in the case of battery life being at a chance of meeting warranty, instead of increasing battery cooling to keep battery temperature within a desired range, embodiments of the present invention reduce usage of the battery and prioritize the usage of the engine to meet driver demand or other power request. As such, embodiments of the present invention provide maintaining battery life following a pre-designed life curve via prioritizing the usage of the engine. When the detected or monitored life of the battery is worse than design expected, control can pull up the engine earlier and/or pull down the engine later compared to a base control operation, to thereby improve battery life.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A vehicle comprising:
   a traction battery;
   an engine; and
   a controller configured to adjust a threshold for an engine request when a state of health (SOH) of the traction battery is at a chance of violating a target; and
   wherein the threshold is either an engine pull up (EPU) threshold or an engine pull down (EPD) threshold, and the controller is further configured to lower the threshold when the SOH of the traction battery is at a chance of violating the target.

2. The vehicle of claim 1 wherein:
   the controller is configured to detect that the SOH of the traction battery is at a chance of violating the target when the SOH of the traction battery is less than an expected SOH.

3. The vehicle of claim 2 wherein:
   the controller adjusts the threshold based on at least one of (i) a difference between the SOH of the traction battery and the expected SOH, (ii) a difference between a rate of change of the SOH of the traction battery and a rate of change of the expected SOH, and (iii) a proximity of the SOH of the traction battery to the target.

4. The vehicle of claim 1 wherein:
   the controller is configured to detect that the SOH of the traction battery is at a chance of violating the target when the SOH of the traction battery is less than an alert level SOH that is less than an expected SOH.

5. The vehicle of claim 4 wherein:
   the controller adjusts the threshold based on at least one of (i) a difference between the SOH of the traction battery and the expected SOH, (ii) a difference between a rate of change of the SOH of the traction battery and a rate of change of the expected SOH, and (iii) a proximity of the SOH of the traction battery to the target.

6. The vehicle of claim 1 wherein:
   the target is a warranty target.

7. The vehicle of claim 1 wherein:
   the target is based on either on vehicle usage time or vehicle driven distance.

8. A system for a vehicle having a traction battery and an engine, the system comprising:
   a detector for detecting a state of health (SOH) of the traction battery;
   a controller configured to generate an engine pull up (EPU) request for starting the engine in response to an input becoming greater than an EPU threshold and to generate an engine pull down (EPD) request for stopping the engine in response to the input becoming less than an EPD threshold; and
   the controller is further configured to lower at least one of the EPU threshold and the EPD threshold when the SOH of the traction battery is at a chance of violating a target.

9. The system of claim 8 wherein:
   the controller is configured to detect that the SOH of the traction battery is at a chance of violating the target when the SOH of the traction battery is less than an expected SOH.

10. The system of claim 9 wherein:
    the controller lowers the at least one of the EPU threshold and the EPD threshold based on at least one of (i) a difference between the SOH of the traction battery and the expected SOH, (ii) a difference between a rate of change of the SOH of the traction battery and a rate of change of the expected SOH, and (iii) a proximity of the SOH of the traction battery to the target.

11. The system of claim 8 wherein:
    the controller is configured to detect that the SOH of the traction battery is at a chance of violating the target when the SOH of the traction battery is less than an alert level SOH that is less than an expected SOH.

12. The system of claim 11 wherein:
the controller adjusts the at least one of the EPU threshold and the EPD threshold based on at least one of (i) a difference between the SOH of the traction battery and the expected SOH, (ii) a difference between a rate of change of the SOH of the traction battery and a rate of change of the expected SOH, and (iii) a proximity of the SOH of the traction battery to the target.

13. A method for use with a vehicle having a traction battery and an engine, the method comprising:
generating a request for the engine in response to an input passing a threshold, wherein the request for the engine is either (i) an engine pull up (EPU) request for starting the engine and the threshold is an EPU threshold or (ii) an engine pull down (EPD) request for stopping the engine and the threshold is an EPD threshold; and
adjusting the threshold by lowering the threshold when a state of health (SOH) of the traction battery is at a chance of violating a target.

14. The method of claim 13 further comprising:
detecting that the SOH of the traction battery is at a chance of violating the target when the SOH of the traction battery is less than an expected SOH; and
wherein adjusting the threshold includes adjusting the threshold based on at least one of (i) a difference between the SOH of the traction battery and the expected SOH, (ii) a difference between a rate of change of the SOH of the traction battery and a rate of change of the expected SOH, and (iii) a proximity of the SOH of the traction battery to the target.

15. The method of claim 13 further comprising:
detecting that the SOH of the traction battery is at a chance of violating the target when the SOH of the traction battery is less than an alert level SOH that is less than an expected SOH; and
wherein adjusting the threshold includes adjusting the threshold based on at least one of (i) a difference between the SOH of the traction battery and the expected SOH, (ii) a difference between a rate of change of the SOH of the traction battery and a rate of change of the expected SOH, and (iii) a proximity of the SOH of the traction battery to the target.

16. The method of claim 13 wherein:
the target is based on either on vehicle usage time or vehicle driven distance.

\* \* \* \* \*